United States Patent [19]

Huntzinger et al.

[11] 3,717,595
[45] Feb. 20, 1973

[54] CELL STABILIZER FOR VINYL RESIN FOAMS
[75] Inventors: Elwood E. Huntzinger, Springfield; Nelson N. Schwartz, Broomal, both of Pa.
[73] Assignee: Air Products and Chemicals, Inc., Philadelphia, Pa.
[22] Filed: Nov. 25, 1970
[21] Appl. No.: 92,850

[52] U.S. Cl. ............260/2.5 P, 161/159, 260/31.8 M, 260/31.8 R, 260/895, 260/898, 260/899
[51] Int. Cl. .........................C08f 47/10, C08f 29/24
[58] Field of Search ..................260/2.5 P, 2.5 E, 899

[56] References Cited

UNITED STATES PATENTS 3,417,038   12/1968   Soltys.................................260/2.5 P
3,454,507   7/1969   Wlaka...............................260/2.5 P Primary Examiner—Murray Tillman
Assistant Examiner—Wilbert J. Briggs, Sr.
Attorney—Barry Moyerman and Harold A. Hormann

[57] ABSTRACT

Production of cellular vinyl foams having desirably low density, good physical characteristics, fine uniform cell structure and the capability for production with short cycle times is achieved by incorporating a new cell stabilizer additive in a foamable precursor composition, such as a plastisol comprising a vinyl resin, plasticizer and blowing agent. The cell stabilizer additive is one or more of the copolymers obtained by the copolymerization of (A) a monomeric $C_2$ to $C_6$ methacrylate and (B) a nitrogen-containing, ethylenically unsaturated monomer in an amount providing nitrogen in the copolymerizate in the range of 0.1 to 10 percent by weight.

13 Claims, No Drawings

CELL STABILIZER FOR VINYL RESIN FOAMS

BACKGROUND OF THE INVENTION

1. Field of the Invention

This invention pertains to methods of producing cellular or porous resinous bodies and the resulting products. More particularly it pertains to foamed vinyl plastics.

2. Prior Art

Vinyl plastics, such as polyvinyl chloride, post-chlorinated polyvinyl chloride and polyvinyl chloride-vinyl acetate copolymers are well known to the art. Foamed vinyls have their own particular area of use such, for example, as laminated backing for various fabrics and as vinyl sheeting to improve "hand" and comfort values. Other uses include underlayments laminated to carpeting and to other floor coverings which benefit from added resiliency; as rug pads; furniture padding; and in certain circumstances, as an insulation material.

Considerable variation is possible in formulations designed to produce products adapted to some particular use. In general the fundamental ingredients include a vinyl resin, either polyvinyl chloride or polyvinyl chloride acetate resin, and a plasticizer. In the preparation of vinyl foams the foaming is induced during heating by the incorporation in the formulation of a blowing agent which releases cell forming gases. Foamed products also may be obtained by mechanical frothing just prior to fusion. Usually the formulation includes some form of heat stabilizing additive. Numerous other ingredients may be employed as fillers, extenders, coloring agents, or the like.

Prior art delaing with vinyl plastics is extensive. Some patents concerned with various aspects include U.S. Pat. Nos. 2,056,796; 2,960,728; 3,093,525; 3,050,412; 3,063,110; 2,917,472; 3,197,423; 3,267,197; 3,284,545; 3,399,107 and 3,417,038. Such art covers a broad spectrum including much of conventional practice.

The cell stabilizer additives of the present invention differ from the general run of materials previously identified as stabilizers, which term is rather loosely applied to many types of additives serving a variety of stabilizing functions, particularly as against heat degradation, the effects of ultra violet light, etc.

The problem area concerns the stabilization of the precursor composition during the critical period in which the vinyl foam precursor system, comprising a chemical blowing agent, goes through the transition region in which the blowing agent releases its foam forming gas with resultant nucleation and growth of the bubbles characterizing the cellular structure of the fused foamed vinyl plastic.

SUMMARY OF THE INVENTION

Briefly summarized the invention provides a method for the preparation of precursor compositions and for their transformation into cellular vinyl foam products having desirably low density, good physical characteristics, particularly fine and uniform cell structures and the capability of short cycle times. The precursor material comprises a vinyl resin, a plasticizing agent, a chemical blowing agent and the cell stabilizer additive of this invention. Such cell stabilizer additive is employed in an amount in the range of 0.05 to 2.0 parts by weight per 100 parts by weight of fusible resin in the formulation.

The effective cell stabilizer additive is one or more of the copolymers obtained by the copolymerization of (A) a $C_2$ to $C_6$ methacrylate and (B) a nitrogen-containing, ethylenically unsaturated monomer employed in an amount providing nitrogen in the copolymerizate in the range of 0.1 to 10 percent by weight. The monomeric $C_2$ to $C_6$ methacrylates are derived from methacrylic acid and are the esters of methacrylic acid with alcohols having from two to six carbon atoms. The normal butyl and isobutyl methacrylates are good examples of appropriate methacrylates.

The nitrogen-containing ethylenically unsaturated monomer may be any of the amino, nitrilo and/or amide acyclic compounds having at least three but no more than 10 carbon atoms, and cyclic compounds in which the nitrogen may be in the ring structure and/or as an amino, nitrilo and/or amide-type nitrogen in one or more alkyl substituents on the nuclear structure. Such nitrogen-containing monomeric materials include dimethyl aminoethyl methacrylate, diethyl aminoethyl methacrylate, vinyl pyridine, 2-vinyl-5-ethyl pyridine, 2-methyl-5-vinyl pyridine, ehtyleneimine methacrylate, acrylonitrile, methacrylonitrile, acrylamide, methacrylamide, N-vinyl pyrrolidone, N-methylol acrylamide and N-methylol methacrylamide. Particularly preferred is 2-N-t-butylaminoethyl methacrylate.

Use of the cell stabilizer additives of this invention has been found to provide for the preparation of vinyl resin foams having density in the range from 2.5 to 30 pounds per cubic foot or higher, but particularly advantageous in the preparation of low to medium density foams as distinguished from high density foams. The cell structure obtained in the foam is particularly fine and uniform, with relatively uniform cell diameter and distributed generally in the range from about 100 to 300 cells per linear inch.

A further advantage resides in the use of the additives of this invention in formulations having appreciable amounts of the less expensive extender grade resins.

A further advantage is possible in the preparation of foams incorporating the additives of thiy invention whereby it is possible to obtain improved time-temperature relationship in the fusion or cure cycle such that substantially higher temperature fusion is possible with an attendant highly desirable decrease in oven residence time, higher belt speeds, and the like. Whereas present practice usually employs fusion temperatures of about 375°F and temperatures of 400°–425°F are considered high, the practice of this invention permits the use of much higher fusion temperatures.

Accordingly, it is an objective of the invention to provide vinyl foam precursor compositions which will yield a foamed plastic structure having a uniform and fine pore diameter cell structure along with excellent physical and mechanical properties.

It is also an objective of the invention to provide vinyl foams having a low density, a uniform and fine cell structure, and good physical and mechanical characteristics including a smooth and esthetically pleasing surface.

It is also an objective of the invention to provide vinyl foam precursor compositions capable of high temperature fusion with resultant short processing times.

These and other objectives of the invention will be apparent to those skilled in the art from consideration of the description which follows.

DESCRIPTION OF PREFERRED EMBODIMENT

Various polyvinyl precursor formulations were prepared and tested. A series of tests using different proportions of different additives of the invention made it apparent that the precursor compositions, particularly those utilizing dispersion grade of polyvinyl chloride material, should contain from 0.05 to 2.0 parts by weight of the cell stabilizer additive per 100 parts by weight of resin. The additives comprising the above-defined copolymers and the defined amounts refer to the copolymer which may for practical purposes be carried in a suitable solvent or carrier liquid such as mineral spirits or plasticizer — such solvents or carriers having no significant effect on either the fusion or the final product. Any mention of such solvents or carriers is therefore incidental to rather than fundamental in any consideration of the cell stabilizers of this invention.

The following, non-limiting examples are typical of formulations and techniques adopted to demonstrate the benefits and superiority of the invention.

EXAMPLE I

A recipe indicative of prior art formulations was prepared to serve as a basis of reference for the improvements attributable to the invention. This control recipe was as follows:

| Component | Parts by Weight |
| --- | --- |
| A low molecular weight PVC homopolymer resin (EXON 605, Firestone) | 100 |
| DOP (di-2-ethylhexyl phthalate) | 65 |
| Butyl benzyl phthalate | 25 |
| Ba-Cd-Zn heat stabilizer-activator (Advastab ABC-7) | 3 |
| Epoxidized soybean oil (Paraplex G-62) | 2 |
| Blowing agent (azodicarbonamide, added as 50% dispersion in DOP) | 14 |

The plastisol was prepared by mixing the ingredients with a paddle type stirrer (i.e. a Hobart Mixer) for 15 minutes at room temperature. Thereafter, 40 to 60 mil films were cast on release paper and heated for 4 minutes at 400°F. in a mechanical convection oven.

This formulation with no cell stabilizer produced a foam having a rough surface, extremely large and non-uniform cells (approximate cell count per linear inch of 4 to 8) and was totally unsatisfactory as a commercial product.

Further testing of this formulation modified such as with 0.5 to 1.5 parts by weight of methylmethacrylate homopolymer per 100 parts by weight of the resin produce foamed products equally unsatisfactory in nature and quality. When the formulation was modified by adding 0.5 or 1.5 parts by weight of 2-ethylhexyl acrylate homopolymer per 100 parts by weight of the resin some improvement was obtained as noted in a smoother surface but the cell structures were coarse and not uniform and ranged generally in the order of 30–50 cells per linear inch. Similarly, little or no improvement is obtained when the monomeric or homopolymeric nitrogen-containing compounds, as above-described, such as diethyl aminoethyl methacrylate, vinyl pyridine, acrylonitrile or acrylamide are employed as possible modifying additives in the range of 0.1 to 2.0 parts by weight per 100 parts by weight of the resin.

Another typical formulation was prepared as follows:

| Ingredient | Parts by Weight |
| --- | --- |
| PVC intermediate molecular weight homopolymer resin (Marvinol VR-53) | 100 |
| DOP | 45 |
| Epoxidized soybean oil (G-62) | 45 |
| Ba-Cd-Zn Heat Stabilizer (Advastab ABC-7) | 6 |
| Blowing agent-azodicarbonamide, added as 50% dispersion in DOP | 14 |

This formulation, either alone or modified by the addition, in amounts in the range of 0.1 to 2.0 parts by weight per 100 parts by weight of resin, of the monomers or homopolymers of either the methacrylate or nitrogen-containing unsaturated compositions likewise resulted in products of similar unsatisfactory nature.

EXAMPLE II

A copolymer of n-butyl methacrylate and 2-N-t-butyl-aminoethyl methacrylate was prepared using 45 parts by weight of the n-butyl methacrylate and 2 parts by weight of 2-N-t-butyl-aminoethyl methacrylate. The copolymerization was effected by dissolving the monomers in 50 parts by weight of benzene, adding 1 part by weight of benzoyl peroxide as initiator and refluxing for 4 hours. The copolymer was recovered by stripping off the solvent at reduced pressure, dissolving the residue in acetone, adding the acetone solution to a large volume of water to precipitate the copolymer, recovering the precipitate by filtration, and drying the recovered product in a vacuum oven at 45°C. and at 20mm Hg pressure. This copolymer was employed as cell stabilizer in the following formulation, identical, save for the cell stabilizer additive, to the control formulation shown in Example I.

| Component | Parts by Weight |
| --- | --- |
| PVC low molecular weight homopolymer resin (EXON 605) | 100 |
| DOP | 65 |
| Butylbenzyl phthalate | 25 |
| Ba-Cd-Zn heat stabilizer (Advastab ABC-7) | 3 |
| Epoxidized soybean oil (Paraplex G-62) | 2 |
| Blowing agent - azodicarbonamide (added as 50% dispersion in DOP) | 14 |
| Cell Stabilizer — above-described copolymer | 1.5 |

Upon fusion, the plastisol, prepared and handled as in Example I, produced fused product which had a pleasingly smooth surface, and excellent physical and mechanical properties, including uniform and fine pore cell structure with an approximate cell count per linear inch in the range of 125–150.

EXAMPLE III

A copolymer was prepared starting with 45 parts by weight of isobutyl methacrylate and 3 parts by weight of 2-N-t-butylaminoethyl methacrylate dissolved in 50 parts by weight of benzene as solvent; with 1 part by weight of benzoyl peroxide and 1 part by weight of dodecyl mercaptan added as initiator and transfer agent, respectively. Polymerization was effected and the copolymer was recovered in accordance with the procedure described in Example II. This copolymer, with an analyzed nitrogen content of 0.5 percent by weight, was employed as cell stabilizer additive in the same control formulation as in Example I and Example II and in an amount of 1.0 part per 100 parts of resin. The resulting plastisol was fused as in Example II and the resulting product had a very smooth surface and excellent physical and mechanical properties, including a density of approximately 18 pounds per cubic foot and very uniformly sized and distributed pores having a cell count between 200–270 per linear inch. Compression set and indent recovery values were excellent.

EXAMPLE IV

A formulation was prepared using the following:

| Ingredient | Parts by Weight |
| --- | --- |
| PVC resin (Geon 124) | 100 |
| DIOP (di-isoocytylphthalate) | 60 |
| BBP (butylbenzylphthalate) | 20 |
| Epoxidized soybean oil (Paraplex G–62) | 5 |
| Heat Stabilizer (Advastab ABC–7) (Ba-Cd-Zn) | 3 |
| Blowing Agent (Kempore 125) (Azodicarbonamide) | 3 |

This formulation was employed in foam formation without cell stabilizer additive and with 0.4 part of a cell stabilizer of this invention, being the copolymer of isobutyl methacrylate (45 parts by weight) and 2-N-t-butylaminoethyl methacrylate (5 parts by weight), copolymerized as in Example II in 50 parts by weight of benzene as solvent carrier and using 1 part by weight of benzoyl peroxide as initiator. Recovery of the copolymer was as described in Example II. The nitrogen content of the copolymer was analyzed at 0.6 percent by weight. The molecular weight was approximately 35,000.

The several samples, without and with the added cell stabilizer, were spread as a 25 mil coating on release paper and fused for 1.5 minutes at 460°F. The product of the material without the cell stabilizer had a rough surface and approximately 30 cells per linear inch. The product of the material containing the cell stabilizer had a smooth surface and a cell count of 220 cells per linear inch. Foam product of the plastisol containing the cell stabilizer has excellent physical and mechanical properties including a foam density of 20 pounds per cubic foot.

Similar results although not identical results were obtained when samples of the same formulation were modified by the addition of the same amounts, i.e., 0.4 part by weight per 100 parts by weight of the resin, of copolymers of isobutyl methacrylate (47parts) and N-vinyl pyrrolidone (3 parts); a commercially available material similar in composition to the copolymer of isobutyl methacrylate and 2-N-t-butylaminoehtyl methacrylate; isobutyl methacrylate (47 parts) and diacetone acrylamide (3 parts); isobutyl methacrylate (49.5 parts) and methylolacrylamide (0.5 parts); and isobutyl methacrylate (47 parts) and methacrylonitrile (1 part).

Likewise, similar results well within the defined range of desirable foam product characteristics, are obtained when the same formulation is modified by the addition of cell stabilizer copolymers in which the nitrogen-containing precursor monomer was 2-N-t-butylaminoethyl methacrylate and the precursor methacrylate monomer was severally propyl-, amyl-, and hexylmethacrylate. Copolymers formed using octylmethacrylate were unsatisfactory as cell stabilizers within the purview of this invention. The copolymers were prepared by refluxing the mixture of monomers, present in the amounts, and with benzoyl peroxide as polymerization catalyst, as shown below

| Run | 10 | 11 | 12 | 13 | 14 | 15 | 16 | 17 |
| --- | --- | --- | --- | --- | --- | --- | --- | --- |
| TBAEMA | 2 | 2 | 2 | 2 | 2 | 2 | 2 | 2 |
| Butyl MA | 45 | 45 | — | — | — | — | — | — |
| Amyl MA | — | — | 50 | 50 | — | — | — | — |
| Hexyl MA | — | — | — | — | 54 | 54 | — | — |
| Octyl MA | — | — | — | — | — | — | 63 | 63 |
| Benzoyl Peroxide | 1 | 1 | 1 | 1 | 1 | 1 | 1 | 1 |
| Dodecyl Mercaptan | — | 1 | — | 1 | — | 1 | — | 1 |
| Benzene | 50 | 50 | 50 | 50 | 50 | 50 | 50 | 50 |

The solutions were refluxed 4 hours, cooled, and precipitated from methanol; or stripped, dissolved in acetone, and precipitated from water.

The copolymers prepared with $C_3$ and the $C_5$ methacrylates showed the desirable cell stabilizer effect when employed at a additive level of 0.4 part by weight per 100 parts by weight of the resin. The copolymer prepared with the hexylmethacrylate gave approximately equivalent results when employed at a level of 0.7 parts by weight per 100 parts by weight of resin.

EXAMPLE V

The cell stabilizers of the present invention have a definite advantage also in not only providing high quality foam product from the high priced dispersion grade resins but also and particularly in resin systems employing up to sizeable amounts of the considerably less expensive blending resins.

As shown in Table 1 the effect of adding the cell stabilizer of this invention to dispersion grade resin alone and with varying amounts of blending resin shows, as indicated by the cell per linear inch count, the improvement obtainable through the use of such cell stabilizer. The cell stabilizer, where employed, was the copolymer (analyzing 1.97 percent nitrogen by Kjeldahl) of isobutyl methacrylate and t-butylaminoethyl methacrylate as a solution (40 percent copolymer in 60 percent mineral spirits). The recipe for the formulation, exclusive of the cell stabilizer additive, was

| Component | Parts by Weight |
| --- | --- |
| PVC resins (as shown) | 100 |
| DOP | 50 |
| Polymeric Plasticizer (Paraplex G–50 45 parts) (Paraplex G–62 5 parts) | 50 |
| Heat Stabilizer (dibasic-lead phthalate) | 3 |
| Blowing Agent (Azodicarbonamide) | 2 |

The various compounded plastisols were spread as a 25 mil coating on release paper and fused at the noted conditions with the following results.

TABLE 1

| Run | Dispersion Grade Resin (Marvinol 53)% | Blending Resin (Marvinol 14)% | Cell Stabilizer Parts per hundred of Resin | Cells per Linear Inch Fusion at 450°F. for 2 minutes |
|---|---|---|---|---|
| A | 100 | 0 | 0 | 130 |
| B | 100 | 0 | 0.4 | 150 |
| C | 80 | 20 | 0 | 150 |
| D | 80 | 20 | 0.4 | 190 |
| E | 60 | 40 | 0 | 90 |
| F | 60 | 40 | 0.4 | 150 |
| G | 40 | 60 | 0 | 40 |
| H | 40 | 60 | 0.4 | 130 |

These results point to the highly desirable economic advantage through the use of substantial quantity of blanding resin when cell stabilizer of the present invention is employed.

EXAMPLE VI

A formulation was prepared using the following:

| Ingredient | Parts by Weight |
|---|---|
| Dispersion grade resin (Marvinol 53) | 60 |
| Blending resin (Escambia 8200) | 40 |
| DIOP | 60 |
| BBP | 20 |
| Epoxidized soybean oil (Paraplex G–62) | 5 |
| Heat Stabilizer (Advastab ABC–1) | 2 |
| Atomite (Ca CO₃) | 10 |
| Azodicarbonamide (Kempore 125) | 2 |

This formulation was employed in foam formation tests without cell stabilizer additive and with 0.2 part by weight per 100 parts by weight of the total resin of a cell stabilizer of this invention, being the copolymer prepared from isobutyl methacrylate (45 parts by weight) and 2-N-t-butylaminoethyl methacrylate (3 parts by weight).

The several samples, without and with the added cell stabilizer, were spread as a 25 mil coating on release paper and fused at 460°F. The samples without cell stabilizer and with cell stabilizer when fused for 2 minutes gave substantially similar and good results but when fusion was over a 3 minute period the sample with the cell stabilizer additive produced a highly acceptable product with smooth surface and informly sized and distributed cells with a count of 185 to the linear inch whereas the sample without the cell stabilizer gave a product having a rough surface and random sized and distributed cells numbering about 35 to the linear inch.

Further tests with this same formulation in the absence of any cell stabilizer show that no satisfactory foamed product is obtained at fusion temperature in the order of 475°F. at times ranging from less than a minute to several minutes. Likewise, when approximately 3 parts by weight of a copolymer of n-butyl methacrylate and isobutyl methacrylate (as set out in U.S. Pat. No. 3,399,107) is employed as additive per 100 parts by weight of the resin the fused product is blistery with coarse cell structure and areas of collapse.

However, when the cell stabilizer of this Example is added in this formulation on the basis of 0.4 part by weight per 100 parts by weight of the resin and fusion is effected at temperature above 475°F. (in several tests at temperature of approximately 500°F.) the products at fusion times of 2, 1 and 0.5 minutes are of high quality as evidenced by esthetically pleasing smooth surfaces and uniformly distributed fine cell structure which differ in cell count in the various products but in no instances is less than 130 cells per linear inch. This demonstration of a high order of stabilizing effect of the cell stabilizers of this invention is particularly advantageous in securing quality product in short cycle time.

In other tests with this same formulation it was found that the cell stabilizing effect was obtained when the copolymer additive was the copolymer above-defined in this Example, or the copolymer of N-butyl methacrylate and 2-N-t-butylaminoethyl methacrylate, or the copolymer of amylmethacrylate and t-butyl-aminoethyl methacrylate; and such copolymer was employed at additive levels of 0.05, 0.1, 1.0 and 2.0 parts by weight of the resin. Fusion was effected at 460°F. for 2 minutes for each of the several samples.

EXAMPLE VII

A copolymer was prepared from 94 parts by weight of isobutyl methacrylate and 6 parts by weight of methacrylonitrile by reaction at refluxing conditions in a solvent body of 100 parts by weight of benzene and employing 1 part by weight of benzoyl peroxide as polymerization catalyst.

The formulation described in Example VI was employed in a comparison of the effective quality of the copolymer of the isobutyl methacrylate-methacrylonitrile described above and a commercially available terpolymer composition (Houdry FS–100) as described in U.S. Pat. No. 3,417,038 as having cell stabilizing qualities in PVC-type foams.

By comparative test it was found that with the copolymer of this example a fully acceptable product foam, including the feature of relatively uniform diameter and uniformly distributed cells with a count of approximately 130 cells per linear inch, was obtained when the copolymer cell stabilizer was added to the plastisol in an amount of 0.05 part by weight per 100 parts by weight of resin. When the terpolymer of U.S. Pat. No. 3,417,038 was employed in the plastisol as cell stabilizer, it was found that an equal quality foamed product required a minimum of 0.2 part by weight per 100 parts by weight of resin. The improved effective quality of the copolymer cell stabilizer is evident in the 400 percent spread.

It is to be understood that the copolymer cell stabilizers of this invention can be incorporated as part of the precursor system at any point consistent with the retention of their effective identity and uniform distribution throughout the precursor material as subjected to the foaming and fusing conversion to product. Thus these copolymer cell stabilizers are amenable to incorporation in precursor formulations of the plastisol type, the dry blended type, or in conjunction with compatible components intended for subsequent inclusion in appropriate formulations.

EXAMPLE VIII

A copolymer was prepared, as in Example III, from 45 parts by weight of isobutyl methacrylate and 3 parts by weight of 2-N-t-butylaminoethyl methacrylate. The copolymer was recovered as a precipitate and purified as in Example II. Analysis of a portion of the precipitate showed the presence of 0.5 weight percent nitrogen. Pyrolysis of another portion of the precipitate yielded isobutyl methacrylate monomer and a nitrogen-containing transformation product of the 2-N-t-butyl-aminoethyl methacrylate.

A formulation for calendering was prepared with the following:

| Ingredient | Parts by Weight |
|---|---|
| Polyvinyl chloride resin (medium molecular weight) (calendering grade) | 100 |
| DIOP | 80 |
| Heat stabilizer (Nuostabe V-1026) | 2 |
| Stearic Acid | 0.4 |
| Blowing Agent (azodicarbonamide) | 5 |

One batch of this formulation was prepared with no cell stabilizer additive. The above-described copolymer of this invention is added in an amount of 0.15 parts by weight per 100 parts by weight of resin to another batch of the formulation.

The separate batches are mixed in a Hobart mixer for 10 minutes, then calendered on a two roll mill for 7 minutes at roll temperatures of 270°-300°F. The calendered materials are sheeted off at 30 mils thickness. Representative 2 inch by 2 inch squares are cut from the milled sheets and placed on release paper. The squares are then heated in the oven for 2 minutes at 420°F. with resultant foaming of the heat-softened plastic by the decomposed blowing agent. Examination of the foamed products shows the product from the batch containing no cell stabilizer was a foamed material with a cell count of about 50 cells per linear inch and with a rough surface whereas the product from the batch containing the cell stabilizer of this invention is a foamed material with an esthetically pleasing smooth surface and a cell count of about 150 cells per linear inch.

Obviously, many modifications and variations of the invention as hereinbefore set forth may be made without departing from the spirit and scope thereof, and therefore only such limitations should be imposed as are indicated in the appended claims.

What is claimed is:

1. In the preparation of vinyl chloride foam bodies having good physical and mechanical properties by fusing at elevated temperature a precursor plastisol comprising vinyl chloride resin, plasticizer, blowing agent, and a cell stabilizer; the improvement wherein said cell stabilizer consists of at least one copolymer consisting essentially of
   A. an ester of methacrylic acid selected from the group consisting of propyl methacrylate, normal butyl methacrylate, isobutyl methacrylate and amyl methacrylate; and
   B. a nitrogen — containing ethylenically unsaturated monomer in an amount contributing 0.1 to 10% by weight nitrogen in the copolymerizate, said monomer selected from the group consisting of dimethyl aminoethyl methacrylate, diethyl aminoethyl methacrylate, 2-N-t-butylaminoethyl methacrylate, methacrylonitrile, diacetone acrylamide, N-methylolacrylamide and N-methylolmethacrylamide;

said copolymer being present in the plastisol in an amount in the range of 0.05 to 2.0 parts by weight per 100 parts by weight of the resin.

2. The cell stabilizer of claim 1 wherein said monomeric methacrylate is isobutyl methacrylate.

3. The cell stabilizer of claim 1 wherein said nitrogen-containing, ethylenically unsaturated monomer is 2-N-t-butylaminoethyl methacrylate.

4. The cell stabilizer of claim 3 wherein said nitrogen-containing, ethylenically unsaturated monomer contributes nitrogen in an amount in the range of 0.5 to 2.0% by weight of the polymerizate.

5. The cell stabilizer of claim 1 wherein said monomeric methacrylate is normal butylmethacrylate.

6. The cell stabilizer of claim 5 wherein the nitrogen-containing, ethylenically unsaturated monomer is 2-N-t-butylaminoethyl methacrylate.

7. Vinyl chloride bodies prepared by fusing a foamable precursor composition comprising a vinyl chloride resin and a cell stabilizer additive consisting of at least one copolymer consisting essentially of
   A. an ester of methacrylic acid selected from the group consisting of propyl methacrylate, normal butyl methacrylate, isobutyl methacrylate and amyl methacrylate; and
   B. a nitrogen — containing ethylenically unsaturated monomer selected from the group consisting of 2-N-t-butylaminoethyl methacrylate, dimethyl aminoethyl methacrylate, diethyl aminoethyl methacrylate, methacrylonitrile, diacetone acrylamide, N-methylolacrylamide and N-methylolmethacrylamide.

8. Vinyl chloride foam bodies in accordance with claim 7 wherein said cell stabilizer is the copolymer of isobutyl methacrylate and 2-N-t-butylaminoethyl methacrylate.

9. Vinyl chloride foam bodies in accordance with claim 8 wherein said cell stabilizer is present in the foamable precursor composition in an amount in the range of 0.05 to 2 parts by weight per 100 parts by weight of said vinyl chloride resin.

10. Vinyl chloride foam bodies in accordance with claim 7 characterized by fine uniform cell structure with a cell count in the range of 100 to 300 cells per linear inch.

11. Vinyl chloride foam bodies in accordance with claim 10 characterized in having a density in the range of from 2.5 to 30 pounds per cubic foot.

12. The method of preparing vinyl chloride foam bodies comprising
   a. formulating a precursor composition comprising vinyl chloride resin, plasticizer, and blowing agent,
   b. incorporating in the precursor composition as cell stabilizer, in the amount in the range of 0.05 to 2 parts by weight per 100 parts by weight of the vinyl chloride resin, consisting of at least one copolymer consisting essentially of
      A. a $C_3$ to $C_5$ methacrylate and
      B. a nitrogen-containing ethylenically unsaturated monomer providing nitrogen in the copolymerizate in the range of 0.1 to 10% by weight, selected from the group consisting of 2-N-t-butylaminoethyl methacrylate, dimethyl aminoethyl methacrylate, diethyl aminoethyl methacrylate, methacrylonitrile, diacetone acrylamide, N-methylolacrylamide and N-methylolmethacrylamide;

c. heating the precursor composition having incorporated cell stabilizer and effecting transformation into cellular vinyl chloride foam, and
d. recovering the cellular vinyl chloride foam having fine and uniform cell structure as the vinyl chloride foam bodies.

13. The method of preparing vinyl chloride foam product having enhanced cell structure including uniformity of cell size and cell distribution with a cell count within the range of 100–300 cells per linear inch and with a short cycle time comprising:

formulating a vinyl chloride foam precursor composition comprising fusible vinyl chloride resin, plasticizer, blowing agent, and cell stabilizer, said cell stabilizer being employed in an amount in the range of 0.05 to 2.0 parts by weight per 100 parts by weight of the resin, said cell stabilizer consisting of at least one copolymer consisting essentially of a monomeric $C_3$ to $C_5$ methacrylate and a nitrogen-containing, ethylenically unsaturated monomer contributing 0.5 to 2.0% by weight of nitrogen in the polymerizate selected from the group consisting of 2-N-t-butylaminoethyl methacrylate, dimethyl aminoethyl methacrylate, diethyl aminoethyl methacrylate, methacrylonitrile diacetone acrylamide, N-methlolacrylamide and N-methylolmethacrylamide;

fusing said precursor composition at a temperature above 475°F. and below resin decomposition temperature for a time in the range of 0.05 to 2.0 minutes;

and cooling and recovering the fused foam product.

* * * * *